United States Patent Office 2,934,158
Patented Apr. 26, 1960

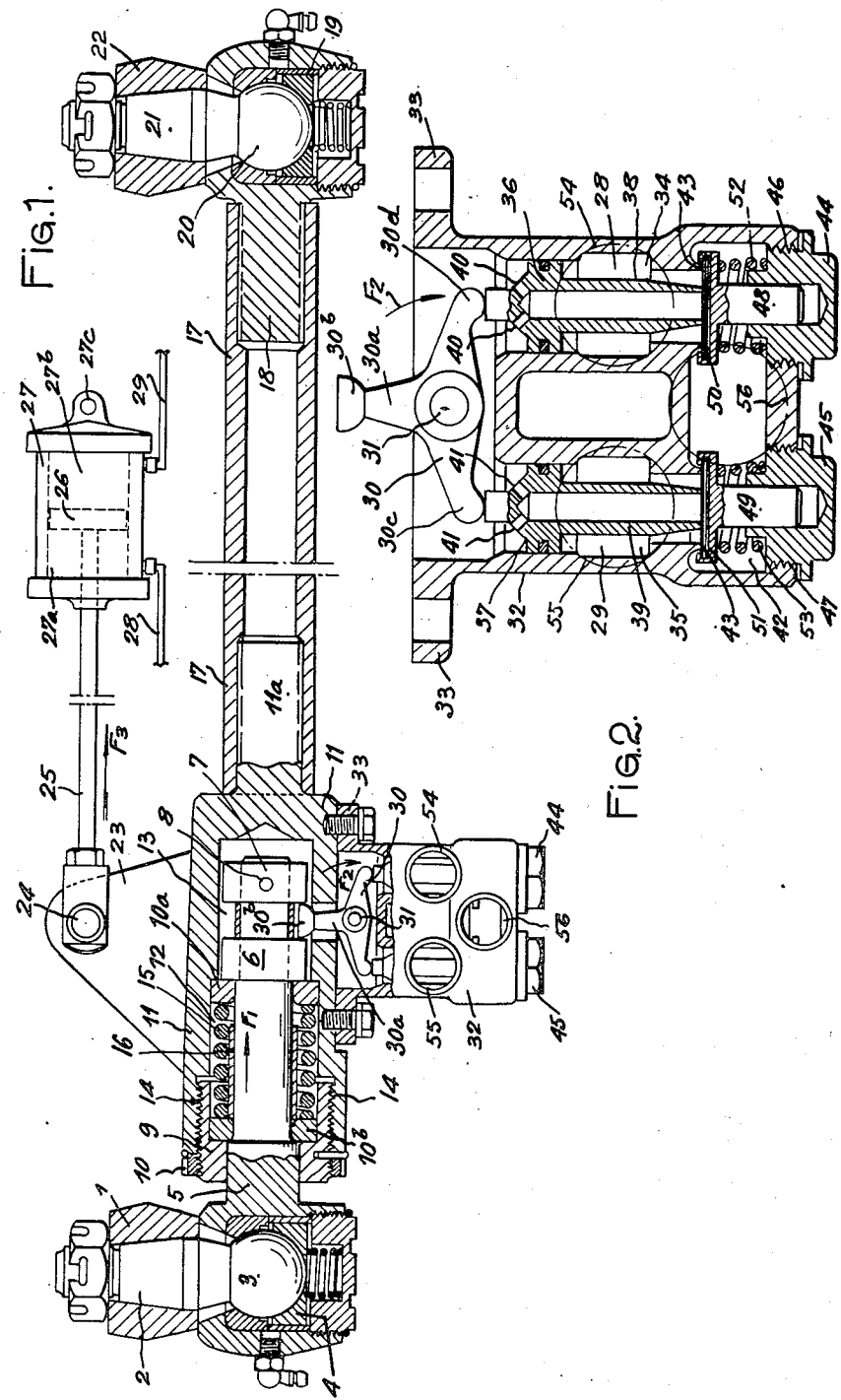

2,934,158
SERVO-STEERING DEVICE FOR MOTOR VEHICLES

Marcel Auguste Onde and Jacques Guerin, Paris, France

Application March 29, 1956, Serial No. 574,769

Claims priority, application France May 3, 1955

1 Claim. (Cl. 180—79.2)

Certain modern vehicles, particularly heavy vehicles, are not equipped with a servo-steering device, and it is difficult to equip them with such device in view of the size of the latter.

This drawback has been overcome by the small size servo-steering device according to the invention which can easily be installed into all vehicles, regardless of whether they are new or used vehicles.

According to the invention, the steering column is connected to a steering-knuckle acting on a rod carrying two nuts between which a double control valve is placed controlling the feed of a double-acting jack acting on the steered wheels of the vehicle through the intervention of suitable transmission, a compensating device formed by a calibrated spring enabling the displacement of the control valve to be obtained in conformity with the resistance offered by the steered wheels to regular movement of the steering column of the vehicle.

Various other characteristics of the invention will become apparent from the following description in connection with the accompanying drawing, in which:

Fig. 1 is an elevational section of a servo-steering device according to the invention mounted on the steering bar of a vehicle.

Fig. 2 shows in vertical section the servo-steering distributor of Fig. 1 but on a somewhat larger scale than Fig. 1.

In Fig. 1, the steering column is connected to the part 1 mounted on a bolt 2 with ball head 3 which latter is journalled in sockets confined by the adjacent head of a rod 5 and the nut 4 threadedly engaging said head. Mounted on rod 5 are two nuts 6, 7 of which nut 7 is secured to rod 5 by a cotter pin 8. A sleeve 9 with outer thread 14 partially encompasses the rod 5 and threadedly engages a second sleeve 11. Sleeve 9 is locked to sleeve 11 by means of a nut 10. Sleeve 11 is provided with two step bores 12 and 13.

Two washers 10a, 10b are arranged in spaced relationship to each other in bore 12 and are mounted on rod 5 while being urged away from each other by a spring 15. The washer 10b is thus pressed against the sleeve 9, whereas washer 10a is pressed against the step formed by the adjacent ends of bores 12 and 13. A tube 16 is freely slidably mounted on rod 5 between the latter and spring 15. The length of the tube 16 is less than the distance separating the two washers 10a and 10b when the latter occupy Fig. 1 position. The sleeve 11 has a threaded extension 11a having screwed thereon one end of a tube 17 the other end of which is screwed to an extension 18 of a head 19. Mounted in head 19 are two sockets which have journalled therein a ball head 20 pertaining to a bolt or pin 21. Pin 21 has mounted thereon a part 22 connected with the steering axle of the vehicle. The part 22 transmits the steering movement to one of the axles carrying one of the steered wheels of the vehicle, and this movement is transmitted to the axle of the second steered wheel by means of the coupling bar. A lug or ear 23 provided with a bar 24 is fixed to the sleeve 11. A rod 25 connects the lug 23 to the piston 26 of a double acting cylinder 27. The numerals 28 and 29 designate the feeding ducts of the double acting cylinder 27. An equalizing bar or lever 30 is movably mounted on a shaft 31 which is mounted in a casing 32 connected by lugs 33 to the sleeve 11. The lever 30 has an extension 30a terminating in a semi-spherical head 30b which is placed between the two nuts 6 and 7 mounted on the rod 5. The casing 32 comprises two chambers 34 and 35 having reciprocably mounted therein pistons 36 and 37 respectively. These pistons have connected thereto hollow piston rods 38 and 39 with bores 40 and 41 respectively through which the interior of said piston rods communicate with the open air. The chambers 34, 35 are adapted to communicate with each other at their lower ends through a chamber 42. The casing 32 is provided with threaded bores 46, 47 respectively closed by abutment members 44 and 45 forming abutments for the lower ends of springs 52 and 53 respectively. The upper ends of springs 52 and 53 continuously urge the valve members 50 and 51 against the valve seats 43 formed by the casing 32. The valve members 50 and 51 are guided by stems 48 and 49 connected thereto and reciprocably mounted in corresponding bores in the abutment members 44 and 45 respectively.

As will be seen from Fig. 2, the upper ends of the pistons 36 and 37 are due to the springs 52 and 53 continuously urged against the arms 30d and 30c of the balancing lever 30. Bores 54 and 55 in chambers 34 and 35 respectively establish communication between said chambers 34 and 35 and the passages 28 and 29 leading to the double acting piston 26, while a bore 56 establishes communication between the chamber 42 and the high pressure tank (not shown) of the pressure fed fluid installation of the vehicle. The reference numeral 27c designates the point where the cylinder 27 is connected to the chassis of the vehicle.

The servo-steering device according to the invention operates in the following manner:

When the operator of the vehicle equipped with the servo-steering device according to the invention turns the steering wheel of his vehicle, said steering wheel acts upon the member 1 which transmits the steering movement to the pin 2 and the steering knuckle 3. As a result thereof, the rod 5 moves for instance in the direction of the arrow F1 (Fig. 1). Inasmuch as the sleeve 11 is connected to the set of steered wheels subjected to the friction on the ground, and since the resistance of the spring 15 is less than that encountered by the wheels, the rod 5 moves the washer 10b in the direction of the arrow F1 against the thrust of the spring 15 intermediate the washers 10a and 10b. The steering movement is thus transmitted to the nuts 6 and 7 which are moved in the direction of the arrow F1. The movement of these nuts causes the balancing lever 30 to pivot in clockwise direction indicated by the screw F2 (Figs. 1 and 2), thereby moving the piston 36 downwardly with regard to Figs. 1 and 2. As a result thereof the piston rod 38 lifts the valve 50 off its seat 43. Simultaneously with the clockwise movement of arm 30d, also arm 30c tilts in clockwise direction so that it does not exert any pressure on the piston 37 so that the spring 53 can close the valve 51 if it should not be closed already.

Liquid under pressure is now conveyed from the high pressure tank (not shown) through bore 56 into the chamber 42 from where it is passed between the valve 50 and the valve seat 43 into the chamber 34. From here the liquid passes through bore 54 and conduit 28 into the chamber 27a of the cylinder 27 and acts upon the left side (with regard to Fig. 1) of piston 26. The piston rod 25 then moves in the direction of the arrow F3 (Fig. 1) while pulling on the lug 23 which in its turn is connected to the sleeve 11. Thus, a displacement of the assembly shown in Fig. 1 is effected in the direction of the arrow F1 through the intervention of the steering rod head 20, rod 21 and the part 22 connected to the steered wheels of the vehicle which are thus easily steered, the driver's effort being limited to the effort required to overcome the resistance of the spring 15 of the distributor 30.

When the driver of the vehicle wishes to steer the wheels in the direction opposite to that indicated by the arrow F1 (Fig. 1), the same maneuvers are effected but the liquid under pressure will be conveyed into the chamber 27b to act upon the adjacent side of the double acting piston 26.

When liquid under pressure is used for operating the servo-steering device, the bores 40 and 41 are connected by ducts to the low pressure tank of the pressure fed equipment of the vehicle. Should the actuating fluid for actuating the servo-steering device fail, the spring 15 is compressed until the washers 10a and 10b abut against the ends of the tube 16. At this instant, the steering column is rigidly connected to the wheels, and the driver can handle the vehicle without the help of the servo-steering or power steering device according to the invention. In this way absolute safety is obtained.

When the vehicle is traveling at high speeds, the reaction—ground friction—of the steered wheels on the steering control is insufficient to cause compression of spring 15. Thus, the transmission of steering movements takes place directly from the sleeve 11 without the help of the servo-steering device. The latter comes into action only when the vehicle has dropped to a lower speed in which the wheels being steered encounter a considerable friction which considerably exceeds the force necessary to compress the spring 15.

The small size of the double valve system 38, 39, 50, 51 in the casing 32 makes it possible to use a small equalizing lever 30 so that the steering device according to the invention can easily be installed into all modern vehicles even into those which have only a small space available.

We claim:

In a control valve system for a power assisted steering mechanism for a motor vehicle having a chassis and wheels: a first control member adapted to be mechanically connected to the wheels to be steered and comprising a first bore with a shoulder at each end and a second bore in axial alignment with said first bore but of a smaller diameter than the latter, a second control member having an extension reciprocably extending through said first bore and having its free end extending into said second bore, said extension being provided with a shoulder remote from said second bore, two spaced abutments connected to said extension within said second bore, two washers axially movably mounted on said extension within said first bore, spring means interposed between said washers and continuously urging the same away from each other toward said shoulders of said first bore, that one of said two washers which is adjacent said second bore being movable by the adjacent one of said two abutments toward the other washer and the other washer being movable by the adjacent shoulder of said first bore toward the washer adjacent said second bore, said spring means being compressable in response to a movement of said extension in either direction, a fluid operable cylinder piston assembly having a movable element linked to said first control member for moving the same in axial direction of said extension and having a stationary element adapted to be linked to the chassis of said motor vehicle, first and second valve means controlling the supply of actuating fluid to and discharge of fluid from said cylinder piston assembly, abutment means connected to said extension and lever means having an arm extending between and operable by said abutment means in response to a certain axial movement of said extension for actuating one or the other one of said first and second valve means depending on the direction of movement of said extension to thereby permit actuating fluid to flow to said cylinder piston assembly for actuating said movable element thereof in one or the other direction.

References Cited in the file of this patent

UNITED STATES PATENTS

| 2,061,120 | Vorech | Nov. 17, 1936 |
| 2,062,485 | Turek | Dec. 1, 1936 |
| 2,069,540 | Sanford | Feb. 2, 1937 |
| 2,424,806 | Eaton | July 29, 1947 |
| 2,554,315 | Price | May 22, 1951 |
| 2,565,929 | Onde | Aug. 28, 1951 |
| 2,737,021 | Edge et al. | Mar. 6, 1956 |
| 2,748,881 | Holley | June 5, 1956 |

FOREIGN PATENTS

| 654,269 | Great Britain | June 13, 1951 |